United States Patent
Rapp

(10) Patent No.: US 6,798,565 B2
(45) Date of Patent: Sep. 28, 2004

(54) METHOD AND ARRANGEMENT FOR COMPENSATING FOR CROSS PHASE MODULATION

(75) Inventor: Lutz Rapp, Deisenhofen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/931,544

(22) Filed: Aug. 16, 2001

(65) Prior Publication Data

US 2002/0044341 A1 Apr. 18, 2002

(30) Foreign Application Priority Data

Aug. 16, 2000 (DE) .......................... 100 39 951

(51) Int. Cl.[7] .................................................. H01S 3/00
(52) U.S. Cl. ................................. 359/337; 359/341.4
(58) Field of Search .................... 359/279, 333–349, 359/174–179, 183, 181, 187, 177, 161; 398/188; 375/11, 4; 455/23

(56) References Cited

U.S. PATENT DOCUMENTS

| | | | | |
|---|---|---|---|---|
| 4,709,417 A | * | 11/1987 | Kuwabara ................... 359/154 |
| 5,097,353 A | * | 3/1992 | Fujiwara et al. ............ 359/177 |
| 5,400,165 A | * | 3/1995 | Gnauck et al. ............. 398/160 |
| 5,467,213 A |   | 11/1995 | Kaede et al. |
| 5,566,381 A | * | 10/1996 | Korotky ...................... 359/161 |
| 5,625,479 A | * | 4/1997 | Suzuki et al. ................. 398/98 |
| 6,124,960 A | * | 9/2000 | Garthe et al. ............... 359/124 |

FOREIGN PATENT DOCUMENTS

| JP | 04281362 A | * | 5/1994 | ........... H04B/10/04 |
|---|---|---|---|---|
| JP | 06132895 A | * | 5/1994 | ........... H04B/10/04 |

OTHER PUBLICATIONS

Kaminow et al. Optical Fiber Telecommunications IIIA. Academic Press. 1997. pp 207–212.*
Saunders et al. Electronic Letts. Sep. 3, 1998 vo. 34, No. 18.*
Becker et al. "Erbium doped fiber amplifiers" Accademic Press 1999.*
Matera et al. CLEO '9923–28 May 1999.*
Henmi et al. ICC '91 Jun. 23–26, 1991.*
M. Shtaif, et al., "Crosstalk in WDM Systems Caused by Cross–Phase Modulation in Erbium–Doped Fiber Amplifiers", In: IEEE Photonics Technology Letters, vol. 10, No. 12, (1998), pp. 1796–1798.

* cited by examiner

Primary Examiner—Thomas H. Tarcza
Assistant Examiner—Stephen Cunningham
(74) Attorney, Agent, or Firm—Bell, Boyd & Lloyd LLC

(57) ABSTRACT

The cross phase modulation generated by a fiber amplifier is compensated for by converting the amplitude variations of the wavelength-division multiplex signal (WMS) into an electrical signal which controls a phase modulator (2) in such a manner that the signal distortion caused by cross phase modulation is compensated for.

11 Claims, 3 Drawing Sheets

METHOD AND ARRANGEMENT FOR COMPENSATING FOR CROSS PHASE MODULATION

BACKGROUND OF THE INVENTION

1. Field of the Invention

The invention relates to a method for compensating for cross phase modulation generated in a fiber amplifier. The invention also relates to arrangements suitable for this purpose.

2. Description of the Related Art

In optical wavelength-division multiplex systems, mutual interference between the individual transmission signals occurs due to cross phase modulation. "IEEE Photonics Technology Letters", Vol. 10, No. 12, December 1998, pages 1796 to 1798, discusses that the cross phase modulation (XPM) generated in a fiber amplifier can be as significant as the phase modulation caused during the propagation in the fiber. The proportions of the contribution of the fiber amplifiers and transmission fiber to cross phase modulation apparently depends on the characteristics of the transmission fiber, the transmission band used, and the fiber amplifier. Further investigations relating to this subject are known from IEEE Photonics letters, Vol. 11, No. 12, pages 1578 to 1580, 1999.

The effects of non-linear effects occurring in the transmission fibers can be reduced by suitable compensation. FIG. 1 shows an example of a link which has amplifiers V, standard single-mode fibers SSMF and a dispersion compensation with dispersion-compensating fibers. Assuming that the dispersion in doped fibers is negligible and nonlinear effects only occur in each case in the second stages of the amplifiers V and the resultant dispersion DSP at the receiver E is equal to "0", phase changes induced in the amplifier cannot be converted into intensity changes of the transmitted signal and no signal distortion occurs due to the cross phase modulation induced in the fiber amplifier. The dispersion, which depends on the length L of the transmission fiber, is shown underneath the transmission link represented diagrammatically.

However, the compensation arrangement is not ideal with respect to the cross phase modulation arising in the transmission fibers. An arrangement in which a dispersion-compensating fiber DCF1 is already inserted before the first transmission fiber is more suitable. In this arrangement, shown in FIG. 2, however, the phase changes induced in the fiber amplifiers can lead to signal distortion.

SUMMARY OF THE INVENTION

It is the object of the invention to provide a method which compensates for the cross phase modulation generated in the fiber amplifiers. In addition, arrangements suitable for this purpose are also provided. This object is achieved by a method for compensating for signal changes of a wavelength-division multiplex signal caused by cross phase modulation in a fiber amplifier, comprising the steps of obtaining a control signal from an optical wavelength division multiplex signal, said control signal controlling a phase modulator; and supplying said control signal with said wavelength-division multiplex signal, in such a manner that signal changes of said wavelength-division multiplex signal caused by cross phase modulation are at least largely compensated for.

The inventive method may further comprise the steps of tapping an optical measurement signal off of said optical wavelength-division multiplex signal; converting said optical measurement signal by opto-electrical conversion into an electrical measurement signal; and converting said electrical measurement signal into said control signal by an adjustable amplifier. A step may also be included of delaying said wavelength-division multiplex signal supplied to said phase modulator with respect to said optical measurement signal. Finally, the inventive method may further comprise the step of measuring signal changes at an output of said phase modulator and controlling said control signal.

The object of the invention is also achieved by an arrangement for compensating for signal changes caused in a wavelength-division multiplex signal by cross phase modulation by a fiber amplifier, having a control circuit comprising a measurement coupler which couples out a part of said wavelength-division multiplex signal as an optical measurement signal; an opto-electrical converter which converts said optical measurement signal into an electrical measurement signal; an electrical amplifier (that may be adjustable) that has an input supplied by said electrical measurement signal and an output which is an amplified measurement signal as a control signal; and a phase modulator having a signal input and a modulation input, said wavelength-division multiplex signal being supplied to said signal input, and said control signal being supplied to said modulation input, a gain being selected such that said phase modulator outputs a wavelength-division multiplex signal which is at least largely compensated for.

In the inventive arrangement, the wavelength-division multiplex signal may be delayed between said measurement coupler and said phase modulator. At least one of said measurement coupler and said phase modulator may be inserted between a number of sections of an amplifier fiber. Finally, the inventive arrangement may be connected immediately before or after said fiber amplifier.

The invention consists in that the intensity fluctuations of the optical wavelength-division multiplex signal, caused by phase modulation, are converted into an electrical signal by way of which the phase modulator is driven which, in turn, converts these into oppositely directed intensity fluctuations. Maximum compensation can be achieved if oppositely directed phase changes are impressed on the intensity fluctuations of the optical signal, immediately before or after the fiber amplifier. Since there are virtually no delay differences between the individual signals in the fiber amplifier (no walk-off), all signals are subject to the same phase changes. The compensation can thus be common to all signals without requiring prior demultiplexing. Furthermore, only the total power significant for driving the phase modulator and it makes no difference how it is distributed over the individual channels.

BRIEF DESCRIPTION OF THE DRAWINGS

Exemplary embodiments of the invention are explained in greater detail below.

DETAILED DESCRIPTION OF THE INVENTION

Figure 1:
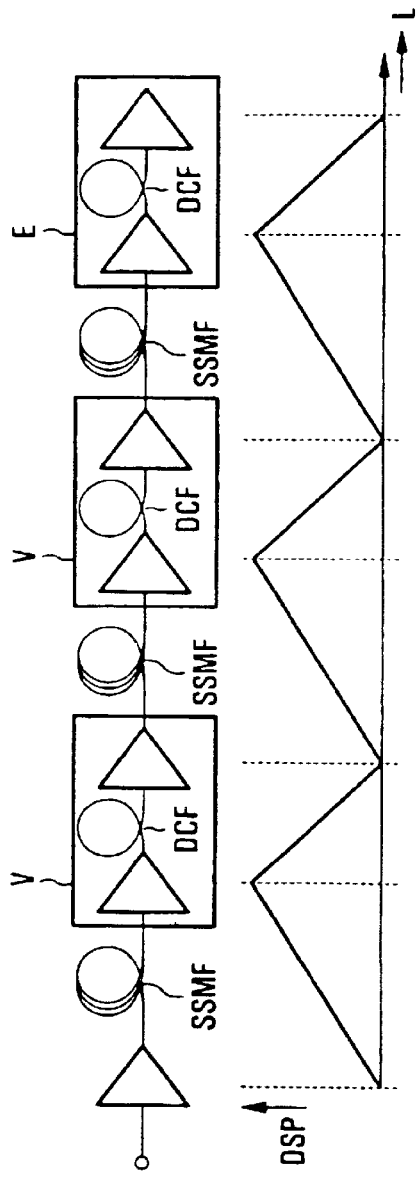
FIG. 1 is a schematic block diagram showing a conventional arrangement for dispersion compensation.
Figure 2:
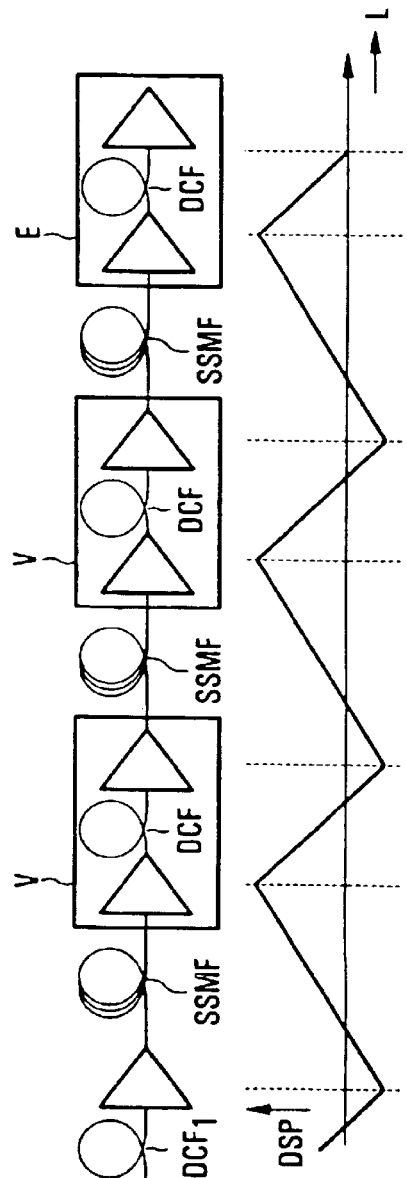
FIG. 2 is a schematic block diagram showing an improved arrangement for dispersion compensation.

Of the arrangements for dispersion compensation previously discussed, the compensation arrangement shown in FIG. 2 additionally requires compensation of the cross phase modulation generated in the fiber amplifiers. The method according to the invention and the arrangements suitable for carrying out the method can be used whenever interfering cross phase modulation is generated in a fiber amplifier.

Figure 3:
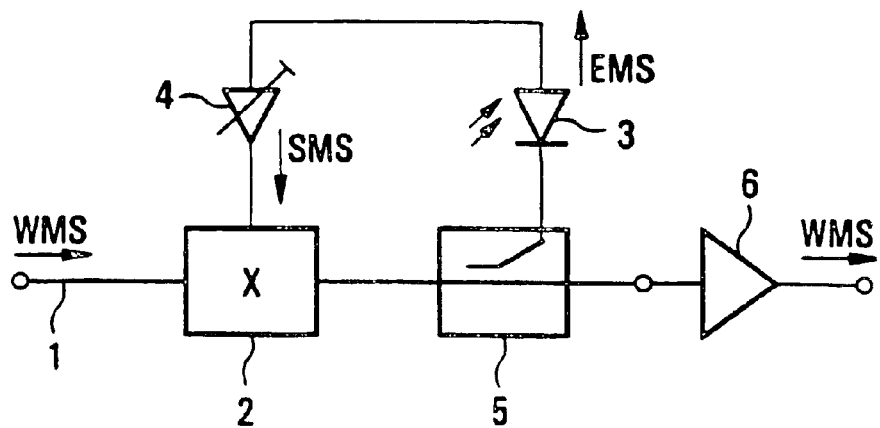
FIG. 3 is a schematic block diagram showing a basic circuit diagram for XPM compensation.

FIG. 3 shows the basic circuit diagram of an XPM compensation arrangement. A wavelength-division multiplex signal WMS is transmitted via a transmission fiber 1 and amplified by a fiber amplifier 6. The input of the fiber amplifier is preceded by an XPM compensation device 5, 3, 4, 2. This contains a phase modulator 2 which is supplied with the wavelength-division multiple signal WMS. The phase modulator is here followed by a measurement coupler 5 which branches off an optical measurement signal OMS corresponding to the wavelength-division multiplex signal whereas the main component of the energy is supplied to the input of the fiber amplifier 6. The optical measurement signal OMS is initially converted, in an opto-electrical transducer, into an electrical measurement signal EMS which can also be used for control purposes for the amplifier, and is then amplified in an electrical amplifier 4. The control signal SMS generated in this manner controls the phase modulator 2 in such a manner that the cross phase modulation generated in the fiber amplifier 6 is at least almost (pre-) compensated for.

Figure 4:
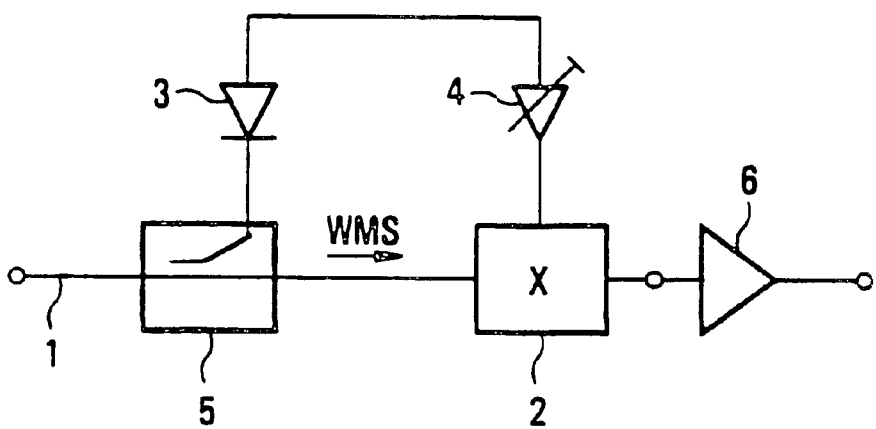
FIG. 4 is a schematic block diagram showing an arrangement for forward compensation.

FIG. 4 shows another XPM compensation arrangement in which measurement coupler 5 and phase modulator 2 are exchanged in terms of their order.

Figure 5:
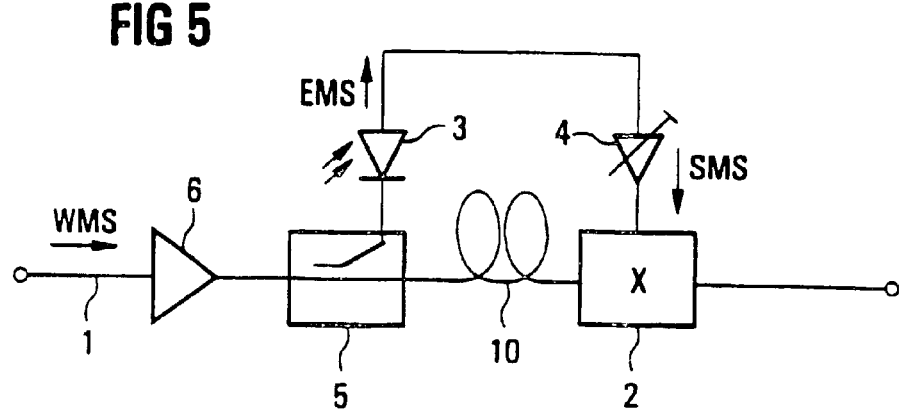
FIG. 5 is a schematic block diagram showing a compensation arrangement connected after the fiber amplifier.

The compensation can be optimized by changing the gain. With the usual high data rates, optimum compensation can be impeded by delays in the transducer 3, the amplifier 4 and the phase modulator 2. This is why a delay device 10 (FIG. 5), which can be constructed as part of the amplifier fiber, of a dispersion-compensating fiber, or as transmission fiber, is inserted between the measurement coupler 5 and the phase modulator 2 in the compensation device shown in FIG. 5. The XPM compensation arrangement follows the fiber amplifier 6 in FIG. 5.

Figure 6:
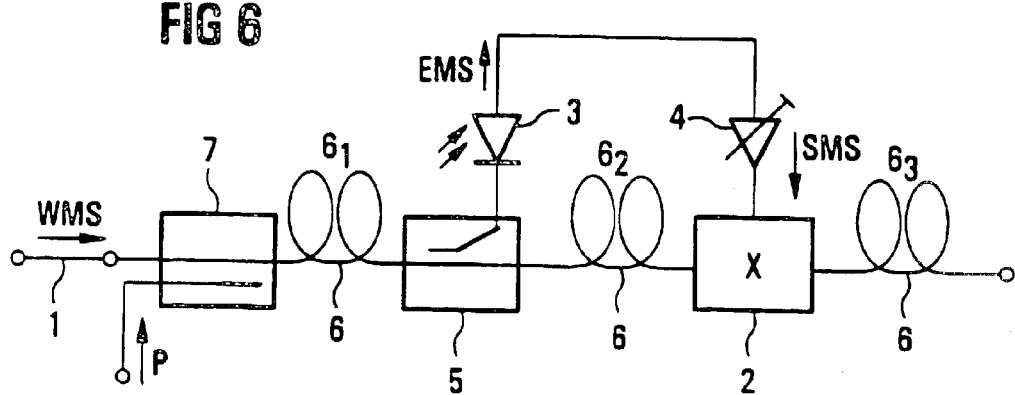
FIG. 6 is a schematic block diagram showing a compensation arrangement in which parts of the amplifier fiber are integrated.

FIG. 6 shows a compensation arrangement in which the measurement coupler 5 and the phase modulator 2 are in each case connected in series with sections 61, 62, 63 of the amplifier fiber. In this case, a part of the amplifier fiber acts as a delay section. The measurement coupler is not connected immediately before the amplifier input so that there is virtually no deterioration in its noise qualities.

Figure 7:
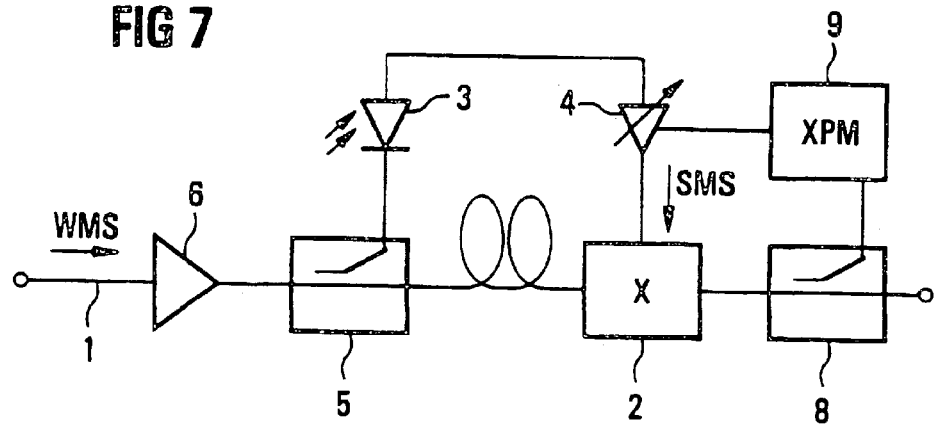
FIG. 7 is a schematic block diagram showing a compensation arrangement with control device.

In FIG. 7, the output of the phase modulator 2 is connected via a second measurement coupler 8 to an XPM measuring and control device. This measures the remaining XPM and adjusts the gain in such a way that it reaches a minimum value. However, corresponding measuring arrangements are still very complex.

The above-described method and apparatus are illustrative of the principles of the present invention. Numerous modifications and adaptations will be readily apparent to those skilled in this art without departing from the spirit and scope of the present invention.

List of Reference Designations
V Amplifier
E Receiver
SSMF Transmission fiber (standard single-mode)
DCF Dispersion-compensating fiber
1 Transmission fiber
2 Phase modulator
3 Opto-electrical transducer
4 Electrical amplifier
5 Measurement coupler
6 Fiber amplifier
61, 62, 63 Fiber section
7 Wavelength-division multiplexer
8 Second measurement coupler
9 XPM measuring and control device
WMS Optical wavelength-division multiplex signal
P Pumping signal
10 Delay device
OMS Optical measurement signal
EMS Electrical measurement signal

What is claimed is:

1. A method for compensating signal changes of a plurality of single signals forming an optical wavelength-division multiplex signal caused by cross phase modulation in a fiber amplifier, said method comprising the steps of:
   coupling out a part of the entire optical wavelength-division multiplex signal;
   generating a control signal from the part of said optical wavelength-division multiplex signal, said control signal controlling a phase modulator; and
   supplying said optical wavelength-division multiplex signal to said phase modulator and modulating the optical wavelength-division multiplex signal by said control signal such that signal changes of said plurality of single signals caused by cross phase modulation are at least largely compensated.

2. The method as claimed in claim 1, further comprising the steps of:
   tapping an optical measurement signal off of said optical Wavelength-division multiplex signal;
   converting said optical measurement signal by opto-electrical conversion into an electrical measurement signal; and
   converting said electrical measurement signal into said control signal by an adjustable amplifier.

3. The method as claimed in claim 2, further comprising the step of delaying said optical wavelength-division multiplex signal supplied to said phase modulator with respect to said optical measurement signal.

4. The method as claimed in claim 1, further comprising the step of measuring signal changes at an output of said phase modulator and controlling said control signal.

5. An arrangement for compensating signal changes of a plurality of single signals forming an optical wavelength-division multiplex signal caused by cross phase modulation in a fiber amplifier, having a control circuit comprising:
   a measurement coupler which couples out a part of said entire wavelength-division multiplex signal as an optical measurement signal;
   an opto-electrical converter which converts said optical measurement signal into an electrical measurement signal;
   an electrical amplifier that has an input supplied by said electrical measurement signal and an output which is an amplified measurement signal as a control signal; and
   a phase modulator having a signal input and a modulation input, said wavelength-division multiplex signal being supplied to said signal input, and said control signal being supplied to said modulation input, a gain being selected such that signal changes of said plurality of single signal by cross phase modulation are at least largely compensated when said phase modulator outputs a wavelength-division multiplex signal.

6. The arrangement as claimed in claim 5, wherein said electrical amplifier is adjustable.

7. The arrangement as claimed in claim 5, wherein said wavelength-division multiplex signal is delayed between said measurement coupler and said phase modulator.

8. The arrangement as claimed in claim 5, wherein at least one of said measurement coupler and said phase modulator is inserted between a number of sections of an amplifier fiber.

9. The arrangement as claimed in claim 5, wherein said arrangement is connected immediately before or after said fiber amplifier.

10. A method for compensating signal changes of a plurality of single signals forming an optical wavelength-division multiplex signal caused by cross phase modulation in a fiber amplifier, the method comprising:

coupling out a portion of the entire optical wavelength-division multiplex signal, wherein the coupled out portion of the optical wavelength-division multiplex signal contains a portion of each wavelength of the optical wavelength-division multiplex signal;

generating a control signal from the portion of the optical wavelength-division multiplex signal, the control signal controlling a phase modulator; and supplying the optical wavelength-division multiplex signal to the phase modulator and modulating the optical wavelength-division multiplex signal by the control signal such that signal changes of the plurality of single signals caused by cross phase modulation are at least largely compensated.

11. An arrangement for compensating signal changes of a plurality of single signals forming an optical wavelength-division multiplex signal caused by cross phase modulation in a fiber amplifier comprising:

a measurement coupler that couples out a part of the entire wavelength-division multiplex signal as an optical measurement signal wherein the coupled out portion of the optical wavelength-division multiplex signal contains a portion of each wavelength of the optical wavelength-division multiplex signal;

an opto-electrical converter that converts the optical measurement signal into an electrical measurement signal;

an electrical amplifier that has an input supplied by said electrical measurement signal and an output that is an amplified measurement signal as a control signal; and a phase modulator having a signal input and a modulation input, the wavelength-division multiplex signal being supplied to said signal input, and the control signal being supplied to said modulation input, a gain being selected such that signal changes of said plurality of single signal by cross phase modulation are at least largely compensated when said phase modulator outputs a wavelength-division multiplex signal.

* * * * *